United States Patent [19]

Goodman

[11] Patent Number: 5,033,030
[45] Date of Patent: Jul. 16, 1991

[54] TURBULENCE VELOCIMETRY TECHNIQUE

[75] Inventor: Louis Goodman, Middletown, R.I.

[73] Assignee: The United States of America as represented by the Secretary of the Navy, Washington, D.C.

[21] Appl. No.: 533,603

[22] Filed: Jun. 5, 1990

[51] Int. Cl.$^5$ .............................................. G01S 15/00
[52] U.S. Cl. ........................................ 367/89; 367/90
[58] Field of Search .................. 367/89, 90; 73/861.18, 73/861.25; 364/565

[56] References Cited

PUBLICATIONS

Goodman, Doppler Statistics of Ocean Velocity Variability, Jun. 6, 1989, pp. 43–53.
Hermitte et al., "Multibeam Doppler Sonar Observation of Tidal Flow Turbulence", Geophys. Letters, 1983, pp. 717–720.

Primary Examiner—Daniel T. Pihulic
Attorney, Agent, or Firm—Michael J. McGowan; Prithvi C. Lall

[57] ABSTRACT

A technique for obtaining a class of beam patterns is described which results in eliminating the Doppler spread effect of the mean transverse component of flow of scatterers. This is accomplished by weighting various array elements. This component of flow is typically the main contributor to Doppler frequency spread. With this component eliminated, the other contributor of Doppler spread is due to the turbulent or fluctuating scatterer motion on the scale of the scattering volume. This contributor is smaller of the two and is estimated by standard Doppler methods.

4 Claims, 2 Drawing Sheets

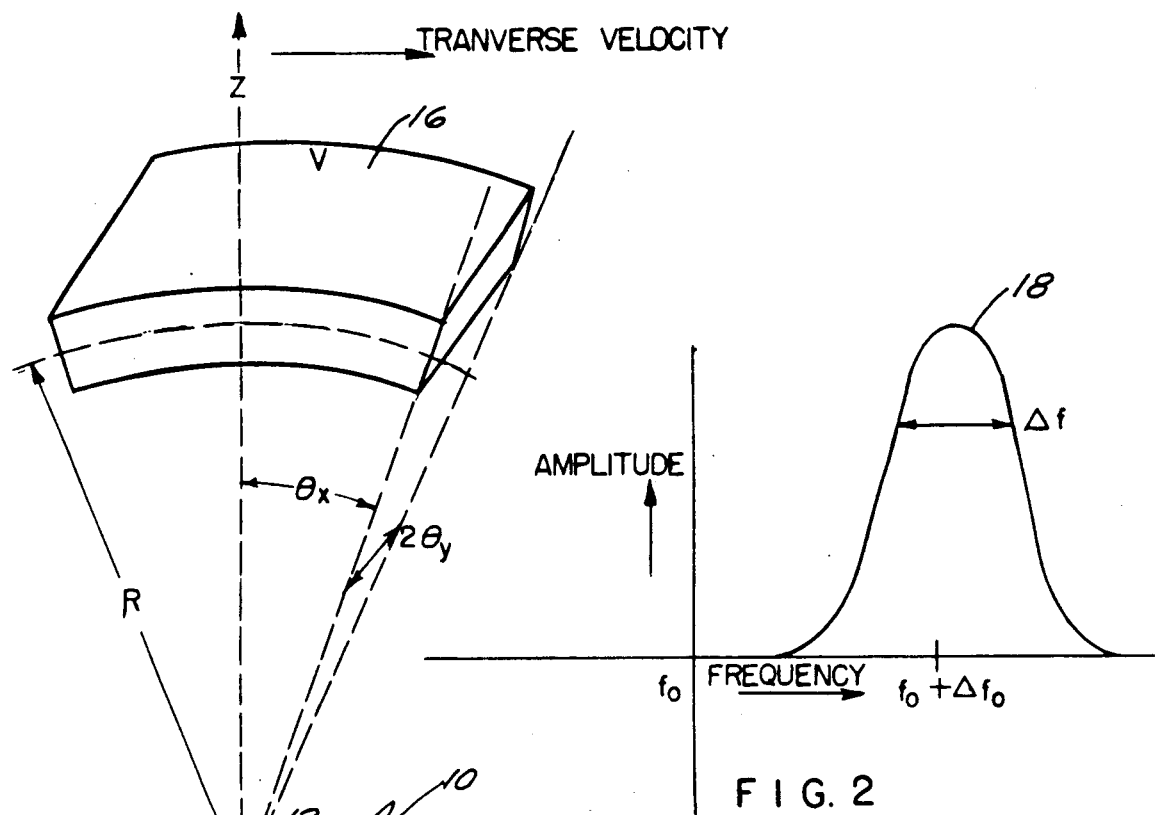
FIG. 1
FIG. 2
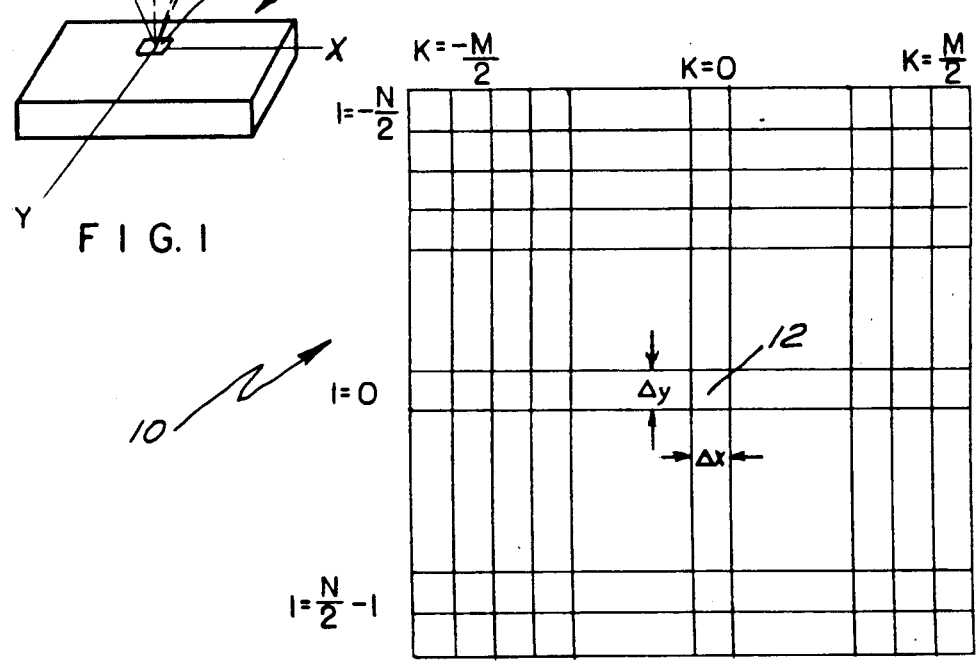
FIG. 3

TURBULENCE VELOCIMETRY TECHNIQUE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to the field of fluid flow measurements and more specifically to a turbulence velocimetry technique by obtaining the Doppler spread of an acoustic signal only due to turbulent or fluctuating motion of scatterers in a fluid such as water.

(2) Statement of the Prior Art

It is becoming increasingly essential to know about fluid flow for ocean waters as it affects movements of ships therethrough. Furthermore, detection of the ships and the like, while at sea, is also important. Additionally, limiting the spreading of an oil spill in a body of water and the distribution of nutrients in the ocean affecting its ecological balance are also important. All these problems involve the study of turbulence fluid flow in the ocean. Thus it is desirable to estimate turbulence in the ocean and its impact under different conditions.

Doppler acoustic techniques are becoming increasingly important in fluid flow measurements. Estimation is typically made of the component of motion of the acoustic scatterers' parallel to the acoustic axis by locating the mean Doppler spectrum. This Doppler shift must be estimated within the zone of the Doppler spread or variance of this shift. The mean component of flow, which is defined as the spatial average over a scattering volume, in the direction of the acoustic axis produces a Doppler shift in the projected frequency from $f_O$ to $f_O + \Delta f_O$. There is also an accompanying Doppler spread, ($\Delta f$) of the spectrum due to the mean vector velocity component of the scatterer motion in the direction perpendicular to the acoustic axis and due to the turbulent or fluctuating component of flow of the scatterers within the scattering volume. Thus information on the vector components of fluid flow averaged over the scattering volume and information on the fluctuating component of flow within the scattering volume are contained in the Doppler spread spectrum. It is thus desired to infer this fluid flow information from estimations made of the Doppler spectrum.

Doppler spread, $\Delta f$, is typically the result of two components of the fluid flow of the scatterers: (1) the mean vector velocity component in the direction perpendicular to the acoustic axis and (2) the turbulent or fluctuating component of fluid flow of the motion of the scatterers within the scattering volume. In general, it is impossible to distinguish between the effects of (1) and (2) which contribute to the Doppler spread. Thus both of these components contribute to the uncertainty of a mean Doppler estimate. In addition, it is not possible in general to use the Doppler spread effects to estimate either the transverse flow or the turbulent flow without a bias effect of one on the other. It is thus desirable to eliminate one of the two components (i.e., transverse component of the scatterers' motion) in order to get a realistic measurement of the other (i.e., the component due to turbulent motion of the scatterers).

SUMMARY OF THE INVENTION

This invention is a technique for the specification of a beam pattern and, in turn, a weighting function for a planar acoustic array, which results in eliminating Doppler spread effects from the mean vector velocity component in the direction perpendicular to the acoustic axis, i.e., due to the transverse components of the velocities of the scatterers, typically the most significant to the Doppler spread. With this component eliminated, the turbulent component of the Doppler spread can be estimated by standard techniques as discussed in "Multibeam Doppler Sonar Observations of Tidal Flow Turbulence", R. L. Hermitte & H. Poor, Geophys. Letters, 10, 8, 717–720 (1983) and "Measurements of Acoustic Correlation in the Ocean with High Frequency Echosounder," Nature, 36, No. 580, pp. 1–3 (1983). This is basically accomplished by using a multi-element array of $(M) \times (N)$ elements, each element of the array being able to act as a projector and a receiver. Two successive pulses are transmitted from an element (taken to be a square for simplicity i.e., $\Delta x = \Delta y$). The back scattered signals corresponding to each of the two transmitted signals are received by every element of the planar acoustic array and weighting factors are generated for every (receiver) element of the planar acoustic array. They are Fourier transforms of the square root of the sinc function, i.e., $$\sqrt{\frac{\sin x}{x}}$$

The weighted received signals are then added for each of the two transmitted signals forming a pulse pair to obtain two weighted signals for the pulse pair. They are multiplied together. This process is repeated with many other pulse pairs and an average of the product of the weighted signals for different pulse pairs is taken so as to obtain the total correlation function. The argument part of the weighting function is normalized so as to eliminate the contribution to the correlation function due to the effect of the transverse component of the velocities of the scatterers. The remaining contribution to the correlation function is then due to the turbulence effect only.

An object of subject invention is to estimate turbulence in a body of water using Doppler techniques.

Another object of subject invention is to eliminate from the Doppler spread effect the contribution due to the transverse component of the scatterers' motion in the body of water.

Still another object of subject invention is to use the weighting technique of the acoustic signal received by different elements of the planar acoustic array.

Other objects, advantages and novel features of the invention will become apparent from the following detailed description thereof when considered in conjunction with the accompanying drawings wherein:

BRIEF DESCRIPTION OF THE DRAWINGS

FIG. 1 diagrammatically shows a planar acoustic array with a plurality of elements and the direction of propagation (i.e., acoustic axis) of an acoustic signal from one of the elements towards a scattering volume.

FIG. 2 is a graphical representation of the Doppler shift and Doppler spread caused by the motion of the scatterers in the scattering volume.

FIG. 3 is a schematic representation of a multi-element ((M) ×(N)) planar acoustic array wherein each of the element can act either as a projector or a receiver.

DESCRIPTION OF THE PREFERRED EMBODIMENT

Figure 4:
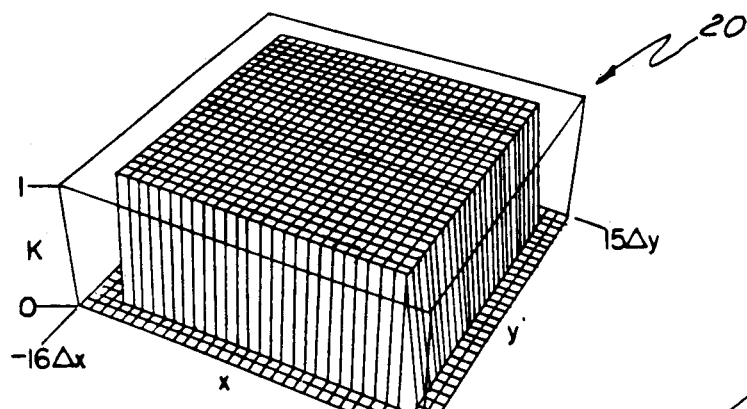
FIG. 4 is a display of the Doppler spread function with a 32 ×32 element grid with each element being a square (i.e., $\Delta x = \Delta y$).

Referring to the drawings wherein like reference characters designate identical or corresponding parts throughout various figures, FIG. 1 shows a planar acoustic array 10 including multi-elements, each of which is preferably represented as a square (i.e., $\Delta x = \Delta y$) for convenience without losing any generality. Each element of the planar acoustic array can act both as a projector and a receiver. As shown in FIG. 1, element 12 transmits omnidirectional acoustic signal giving rise to a wide beam pattern. The transmitted signal is back scattered by a plurality of scatterers in scattering volume 16 and the back-scattered acoustic signal is received by each individual element of the acoustic array 10. The angular distance parameters are also shown in FIG. 1 as $\theta_x$ & $\theta_y$. Z-axis represents the acoustic axis and any motion of the scatterers along the Z-axis introduces Doppler shift in the acoustic signal of frequency $f_O$, wave length $\lambda$ and acoustic wave number $\kappa = 2\pi\kappa$. This phase shift is due to the phase change of the acoustic signal of frequency $f_O$ and wave length $\lambda$. The transverse component of the velocity is in the X-Y plane (i.e., perpendicular to the Z-axis). Doppler shift $\Delta f_o$, is caused by the motion of the scatterers in the Z-direction and results in a phase change in an acoustic signal and in the correlation function of the received signals while the Doppler spread, $\Delta f$, results in a change in an amplitude of the correlation function of the received signals and is due to the transverse component of the motion of the scatterers and due to the turbulent motion of the scatters.

After eliminating the contribution to the Doppler spread function due to the transverse component of the velocities of the scatterers, the remaining contribution to the correlation function is due to turbulent motion of the scatterers.

FIG. 2 is a graphical representation of the Doppler shift ($\Delta f_O$) and Doppler spread ($\Delta f$) of the acoustic signal of frequency $f_o$ and wavelength $\lambda$ resulting from the correlated and decorrelated motions of the scatterers in scattering volume 16. Doppler spread is represented by curve 18 which is symmetrical about point $f_0 + \Delta f_0$ along the frequency axis. FIG. 3 is a graphical representation of planar acoustic array 10 with running indicies k and l varying from $-M2$ to $+M2$ & $-N/2$ to $+(N/2)-1$ and an array 10 having (M)×(N) elements as shown in FIG. 3.

FIG. 4 is a graphical representation 20 of the Doppler spread function K which represents only the transverse component of flow of motion of the scatterers in the scattering volume 16.

As shown in the prior art in general and particularly in my article: "Doppler Statistics of Ocean Variability" by Louis Goodman presented at the Second Navy Independent Research/Independent Exploratory Development Symposium at Naval Surface Warfare Center, Silver Spring, MD on 6-7 June 1989 wherein, Doppler spread correlation function K is given by $$K = \frac{\int d\Omega B^2 \exp(i2v_h \cdot q\tau)}{\int d\Omega B^2}$$

where $\Omega$ is the solid angle associated with the beam; and $$\vec{\kappa} = \theta\{\sin(\kappa_x), \sin(\theta_y)\};$$

$\vec{\kappa}_h$ is the transverse scatterer velocity vector and $\tau$ is the time between two successive transmitted acoustic signals to form a pulse pair and is determined by the size of the acoustic array, range, etc.

K is obtained by using a beam pattern B (magnitude and directionality) which can be shown to be related to weighting functions or factors associated with various elements of the planar acoustic array 10, the geometry (dimensions, etc.) of the array 10, scatterers in the scattering volume 16 and the back-scattered acoustic signals received by each element of the planar acoustic array. It can be shown that using back scattered acoustic signals received by various elements of the planar acoustic array 10, the beam pattern B (magnitude and directionality) is given by $$B = \int\int dx dy W(x,y) \exp-(i\kappa x \sin\theta_x + i\kappa y \theta_y)$$

where W(x,y) is the weighting factor associated with each element of the array.

It can be shown that if we choose W(x,y) from the look-up tables, obtained by numerical methods, for an array configuration of discrete (M)×(N) elements, in such a way that B, the beam pattern (magnitude and directionality) is given by $$B = \text{Sinc}\left[\kappa \frac{L_x}{2} \sin\theta_x\right] \times \left[\text{sinc}\left[\kappa \frac{L_y}{2} \sin\theta_y\right]\right]$$

where $$\text{Sinc}(q) = \sqrt{\frac{\sin(q)}{q}}$$

and $\kappa$ = acoustic wave number $= 2\pi/\lambda$. $L_x$ and $L_y$ are the lengths of the acoustic planar array along the X-axis and Y-axis respectively and angles $\theta_x$ and $\theta_y$ are the angular distances as shown in FIG. 1.

With this requirement imposed upon the weighting factors for various elements, we eliminate the contribution by the transverse component of motion of the scatterers, leaving only the contribution due to turbulence.

Figure 5:
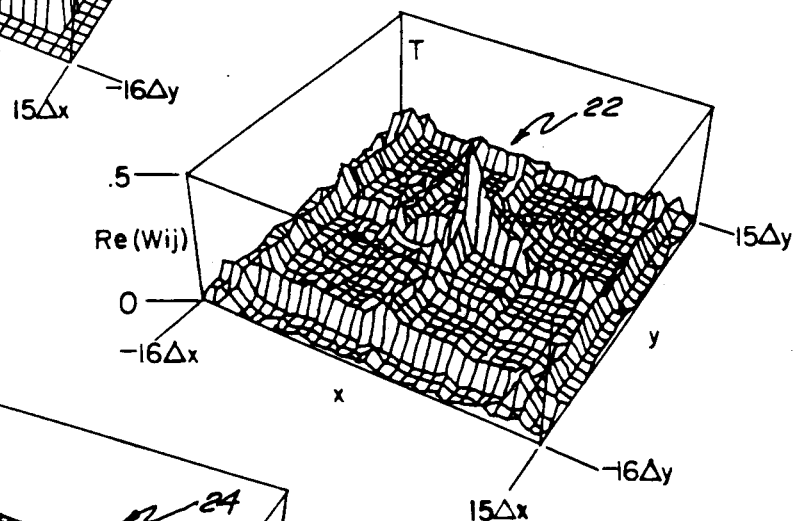
FIG. 5 is a graphical representation of the real part of the complex weighting function for each element of the array.
Figure 6:
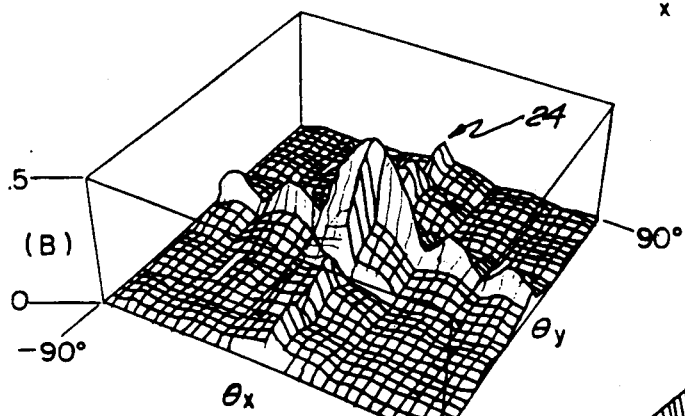
FIG. 6 is a graphical representation of the beam pattern (magnitude and directionality) required to produce the Doppler spread function of FIG. 4 which is unity over a certain period.
Figure 7:
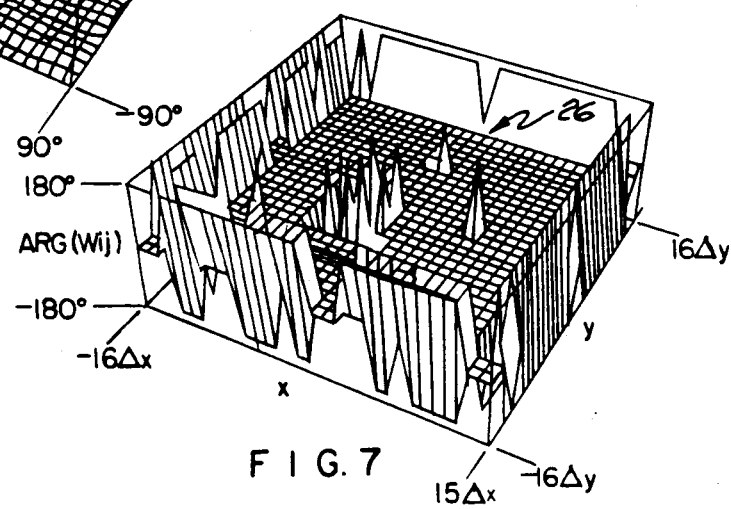
FIG. 7 is a graphical representation of the argument of the complex weighting function for each element of the array.

FIG. 5 is a graphical representation 22 of the real part of the weighting factors. FIG. 6 is a representation 24 of the beam pattern (magnitude and directionality) and FIG. 7 is a representation 26 of the argument (phase part) of the Doppler spread function. Combining the real part of the Doppler spread function and the argument thereof we get the beam pattern amplitude as shown in FIG. 6, which gives the Doppler spread function of FIG. 4, which leaves only the contribution due to the turbulent motion of the scatterers.

Consequently, following the teachings of the subject invention, the technique for measuring turbulence represented by the motion of the scatterers in a body of water using a multi-element planar acoustic array, with each element acting as a projector and/or receiver, is as follows:

1. One of the acoustic elements of the array acts as a transmitter sending first an acoustic signal along the acoustic axis into a scattering volume having a plurality of scatterers in motion. The back-scattered acoustic signals from each of the scatterers is received by each element of the array. This gives a back-scattered received acoustic signal by each member of the multi-element planar acoustic array of known dimensions.

2. From the look-up tables, numerically pre-computed, we get the weighting function or factor for each element of the acoustic array. Multiply the back-scattered received acoustic signal by each element by its corresponding weighting function and add them together to obtain a number represented by A (i.e., $A = c_{11}W_{11} + c_{12}W_{12} + \ldots$).

3. Repeat the same process by using a second acoustic pulse so as to obtain a number B (i.e., $B = C'_{11}W^*_{11} + C'_{12}W^*_{12} + \ldots$). It should be noted that $W^*_{11}, W^*_{12} \ldots$ are the complex conjugate functions of $W_{11}, W_{12}$, respectively. Multiply A and B and take the magnitude of $[A \times B]$ to get a number $C_1$ for a pulse pair given by acoustic signals 1 and 2. The time interval between the two acoustic signals forming a pulse pair is determined by the characteristics of the planar acoustic array and the range.

4. Repeat steps 1 through 3 for a number of pulse pairs to obtain $C_2, C_3, \ldots C_R$ and find the average of these numbers $$C = \frac{C_1 + C_2 + \ldots C_R}{R}$$

Then C is a measure of turbulence as the remaining Doppler spread is due to the turbulent motion of the scatterers in the scattering volume. This information can be used to address the particular issue which is dependent on the information regarding the turbulence in the fluid.

Briefly stated, estimation of turbulence in a body of water using the technique of subject invention is obtained by using a planar multi-element (M)×(N) acoustic where each element can act either as a transmitter or a receiver. A pulse pair comprising two acoustic signals which are preselected time separation are transmitted by one of the elements of the planar acoustic array. The pulse pair is back scattered by a plurality of scatterers in motion due to turbulence inside a scattering volume and are received by all elements of the planar acoustic array. The received acoustic signals are weighted using the teachings of subject invention to eliminate the effects of factors other than turbulence and thus get an estimate of turbulence.

It will be understood that various changes in details, materials, steps and arrangement of parts, which have been described in the preferred embodiment to explain the teachings of subject invention. As an example, the number of elements of the planar acoustic array can be varied. Additionally, the size and configuration of the elements can also be changed. The materials of which the elements of the array are made of can also be changed without deviating from the teachings of subject invention. It is therefore understood that within the scope of the appended claims the invention may be practiced otherwise than as specifically described.

What is claimed is:

1. A method for determining contribution due to turbulence in a Doppler spread function caused by the motion of scatterers in a scattering volume in a body of water using a multi-element planar acoustic array which includes the steps of:
   using an element of said multi-element planar acoustic array as a projector to transmit a first acoustic signal and thereafter a second acoustic signal into said scattering volume;
   measuring back scattered parts of said first acoustic signal and said second acoustic signal from said scattering volume using all elements of said multi-element planar acoustic array as receivers;
   computing a weighting factor corresponding to each of said back scattered parts of said first acoustic signal and second acoustic signal as received by each element of said multi-element planar acoustic array;
   multiplying each of said back scattered parts of said first acoustic signal and said second acoustic signal as received by each element of said multi-element planar acoustic array by a corresponding weighing factor to obtain a plurality of weighted back scattered signals due to said first acoustic signal and due to said second acoustic signal;
   computing a weighted average of said weighted back scattered acoustic signals due to said first acoustic signal and said second acoustic signal;
   multiplying the weighted back scattered acoustic signals for a first pulse pair formed by said first and said second acoustic signals;
   repeating the process for multiplying the weighted back scattered acoustic signals corresponding to a plurality of pulse pairs similar to said first pulse pair; and
   finding the average of the products of the two weighted back scattered acoustic signals for said plurality of pulse pairs which is a measure of said Doppler spread function having contribution due to turbulence.

2. The method of claim 1 wherein the step of determining a weighting factor for each of said scattered acoustic signal includes taking square root of the sinc function.

3. The method of claim 1 which further includes the step of normalizing the contribution due to the transverse component of velocity perpendicular to the acoustic axis to unity.

4. The method of claim 1 which includes the step of using every member of said multi-element planar acoustic array for transmitting and receiving acoustic signals.

* * * * *